May 29, 1923. 1,456,925
H. A. HECKMANN
MECHANISM FOR MAKING PISTON RINGS
Filed Dec. 5, 1921 3 Sheets-Sheet 3
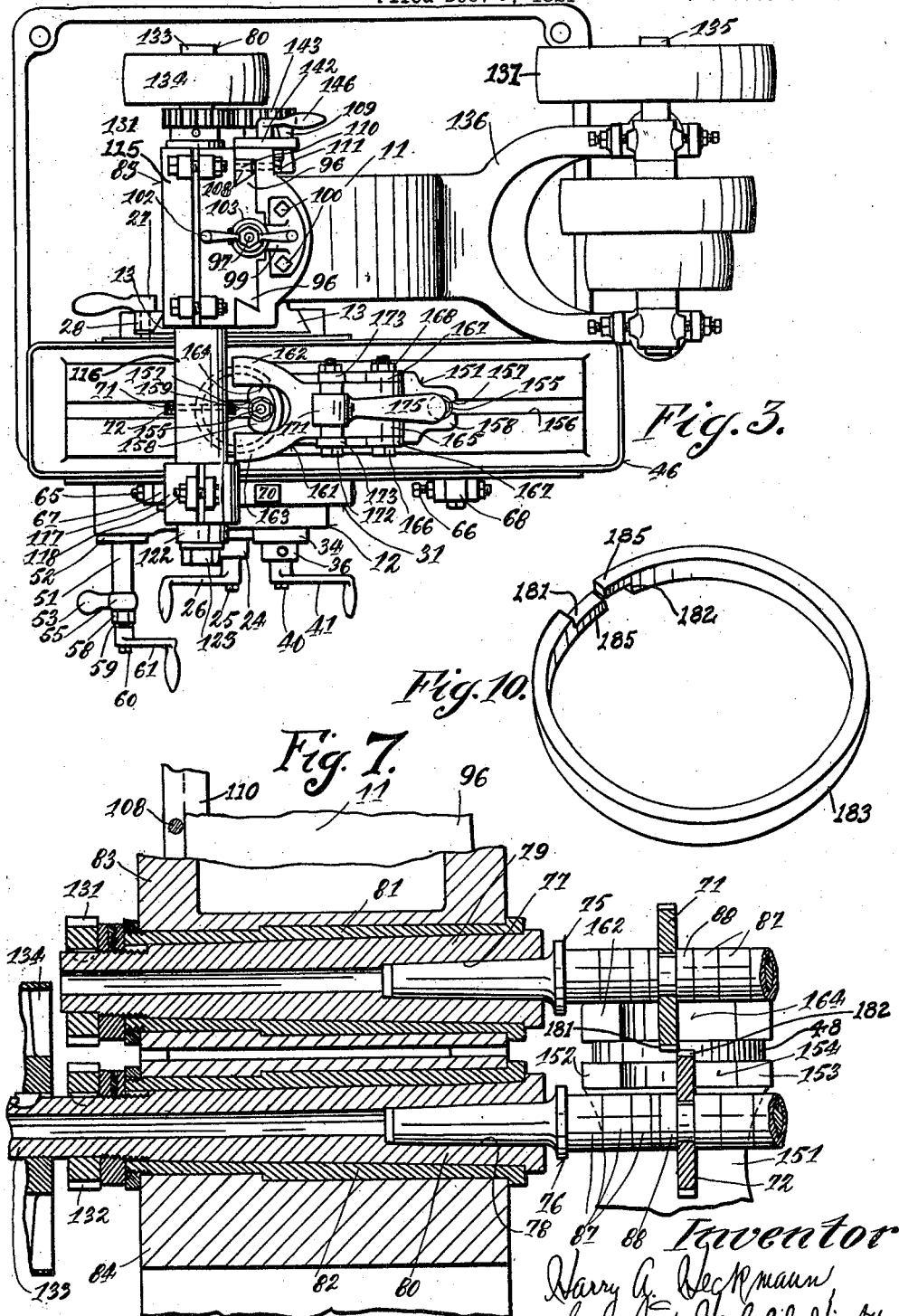

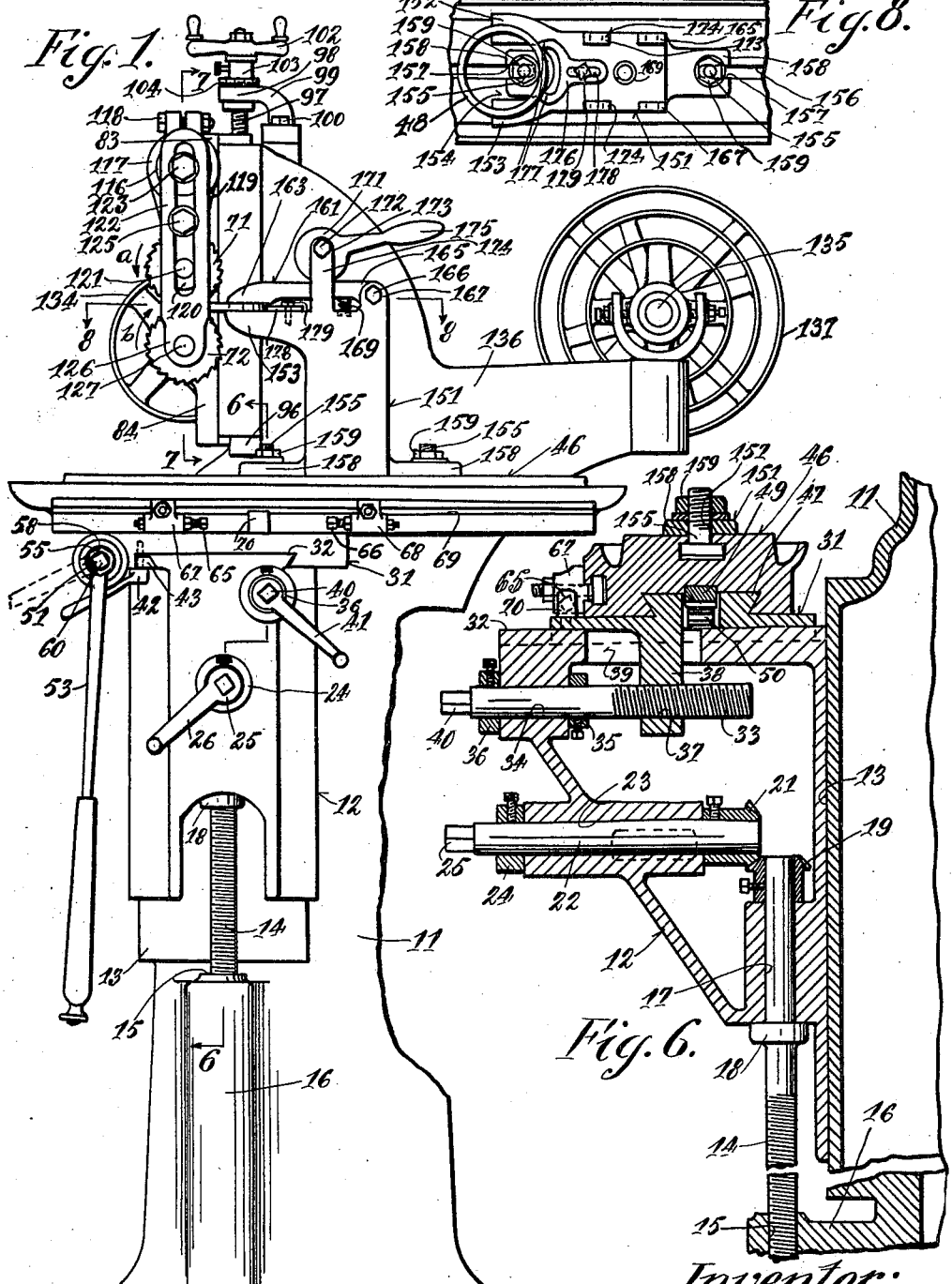

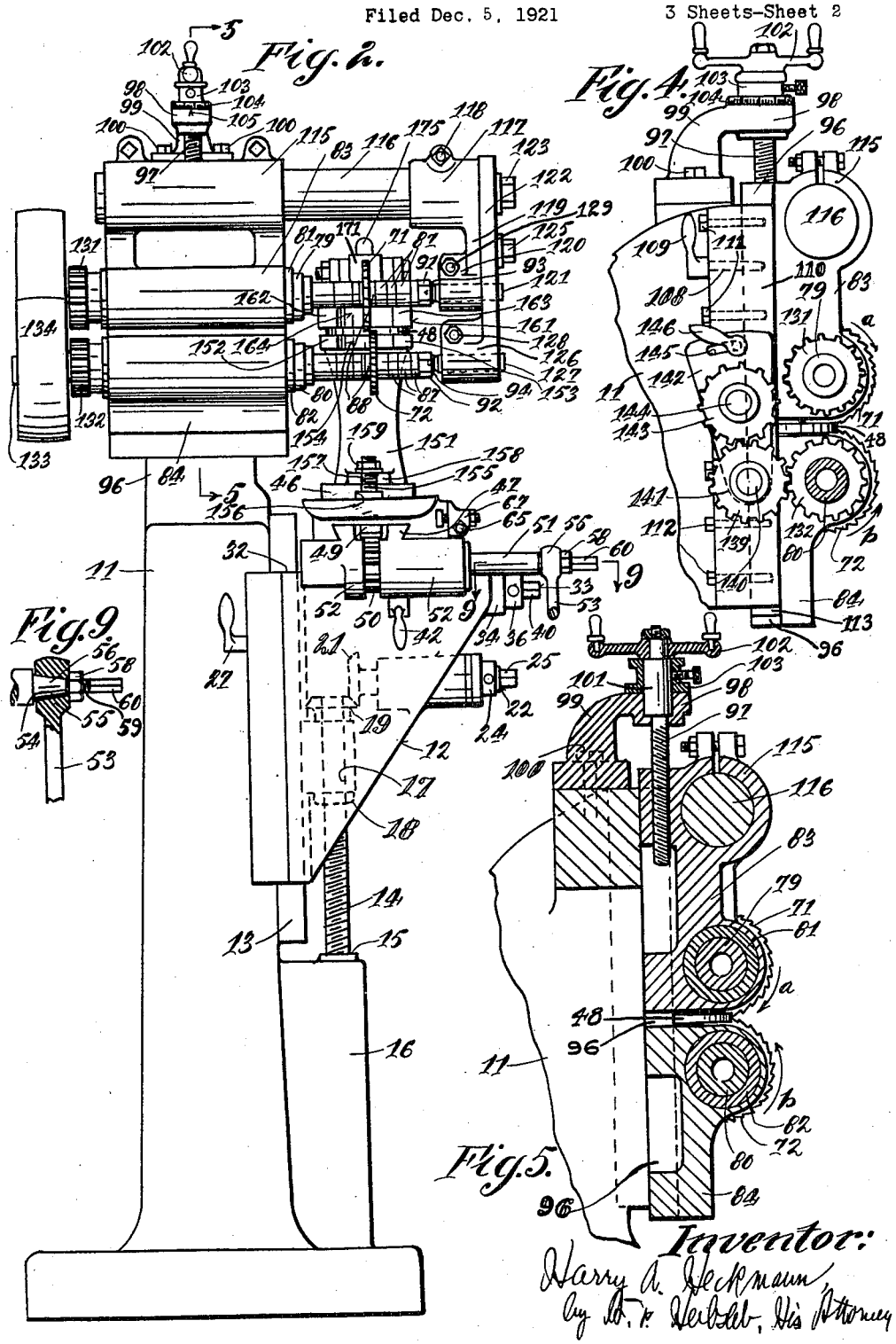

Patented May 29, 1923.

1,456,925

UNITED STATES PATENT OFFICE.

HARRY A. HECKMANN, OF CINCINNATI, OHIO, ASSIGNOR TO THE UNITED STATES MACHINE TOOL COMPANY, OF CINCINNATI, OHIO, A CORPORATION OF OHIO.

MECHANISM FOR MAKING PISTON RINGS.

Application filed December 5, 1921. Serial No. 520,039.

*To all whom it may concern:*

Be it known that I, HARRY A. HECKMANN, a citizen of the United States, residing at Cincinnati, in the county of Hamilton and State of Ohio, have invented certain new and useful Improvements in Mechanism for Making Piston Rings, of which the following is a specification.

It is the object of my invention to provide new and improved means for the accurate production of piston rings; further, to provide a pair of rotary cutter-blades or saws so arranged that they will act simultaneously on both sides of the piston ring in off-set relation, so as to cut a groove in each side of the piston ring and simultaneously divide the piston ring so as to split the same and provide each split end with a rabbet and a tongue, the tongues and rabbets mating each other for forming a split piston ring having overlapping ends; further, to provide novel adjustments whereby the relations of the rotary cutter-blades or saws may be adjusted; and, further, to provide novel holding means for presenting the piston rings to the rotary cutter-blades or saws.

The invention will be further readily understood from the following description and claims, and from the drawings, in which latter:

Fig. 1 is a side elevation of my improved mechanism.

Fig. 2 is a head end elevation of the same.

Fig. 3 is a plan view of the same.

Fig. 4 is a rear elevation of a portion of the same.

Fig. 5 is a vertical cross-section of the same, taken on the line 5—5 of Fig. 2.

Fig. 6 is a vertical section of the same, taken on the irregular line 6—6 of Fig. 1.

Fig. 7 is a vertical axial section of the same, taken on the line 7—7 of Fig. 1.

Fig. 8 is a horizontal section, taken on the line 8—8 of Fig. 1.

Fig. 9 is a detail in section on the line 9—9 of Fig. 2; and,

Fig. 10 is a perspective view of an exemplification of a piston ring made by my improved mechanism.

11 represents a column of suitable form of my improved device. 12 is a knee, which is adjustable up and down on guide-ways 13 on the column. The adjustment is shown accomplished by means of an adjusting screw 14, having threaded connection with a threaded bearing 15 on a bracket 16 extending from the column, and being journaled in a bearing 17 in the knee. A collar 18 is part of the adjusting screw below the bearing 17. The adjusting screw also has a bevel-gear 19 fixed thereto, and is held endwise in its journal-bearing by said collar and said bevel-gear.

A bevel-gear 21 meshes with the bevel-gear 19, and is fixed to a shaft 22, journaled in a bearing 23 in the knee. A collar 24 is fixed to this shaft. The shaft is held endwise in the bearing between said bevel-gear 21 and said collar 24. The shaft 22 is provided with suitable turning means, as a square end 25, arranged to receive a suitable turning wrench 26. A clamp 27, acting on a gib 28, clamps the knee in adjusted positions.

A saddle 31 is adjustable on a guide-way 32 on the knee, the adjustment of the saddle being toward and from the column, accomplished for instance by means of a screw 33 journaled in a bearing 34 in the knee, in which it is held against endwise movement by collars 35, 36. The screw has threaded engagement in a threaded bearing 37, on a hanger 38, depending from the saddle, and received through an opening 39 in the top of the knee. The shaft is provided with suitable turning means, as a square end 40, arranged to receive a suitable socket-wrench 41 for turning the same. A clamp 42 acting on a gib 43 clamps the saddle in adjusted relation.

A table 46 is slidable lengthwise on a guide-way 47 on the saddle. The table is arranged to have the blank 48 out of which to cut the piston ring, fixed thereto. The table is movable on the saddle, for instance by providing the same with a toothed rack 49, extending lengthwise of the table, with which a pinion 50 meshes. The pinion is on a shaft 51, journaled in bearings 52 of the saddle, and is provided with means for turning the same, shown as an arm 53, releasably secured thereto, as by having a taper socket 54 of its bearing 55 received over a tapered portion 56 of the shaft 51, (see Fig. 9), and arranged to be clamped on the taper on said shaft by means of a nut 58 received over the threaded portion 59 of the shaft. The shaft is provided with a turning means for a wrench, for instance, a square end 60, for receiving a socket-wrench.

When it is desired to shift the table for short distances, equal to the distances necessary when cutting piston rings, the bearing 55 is clamped to the shaft, with the arm extending for instance substantially horizontal or to one side of the shaft, in most convenient arrangement, for instance, as indicated in dotted lines in Fig. 1, so that an up or down movement of the arm throughout an arc of a circle may be sufficient to accomplish the movement of the blank necessary for accomplishing the cutting and return of the table. The cutting movement of the table may be caused by downward gravity movement of the arm. If it is desired to move the table for longer distances or when not performing work, the bearing 55 may be unclamped by partially unthreading the nut 58, and a socket-wrench 61 received over the threaded end of the shaft, as shown in Fig. 3, to turn the shaft and shift the table.

The arm 53 is shown as a long arm, so that little force need be applied to the outer end of the arm for moving the table, for instance, during the feeding movement while the rotary blades or saws are performing the cutting operation.

Means are provided for adjustably limiting the movements of the table, shown as adjustable stops 65, 66, shown as bolts adjustable in blocks 67, 68, arranged to be adjustably fixed in suitable positions, as by bolt and nut clamps, lengthwise of a slot 69 in the front edge of the table. The stops are arranged to strike a stop 70, which is in fixed position on the saddle.

The blank for the piston ring is shown as a closed ring of metal. It is square or rectangular in cross-section, as may be desired, and is arranged to be held to the table for presenting the same to the rotary cutter-blades 71, 72.

The rotary cutter-blades are mounted on arbors 75, 76, the taper ends of which are received in tapered sockets 77, 78 of quills 79, 80, having taper journals, journaled in bushings 81, 82, fixed to slides 83, 84, having relative adjustment between them for adjusting the distance between the arbors, and thereby adjusting the distance between the axes of the rotary cutter-blades. The cutter-blades are axially adjustable lengthwise of the arbors by means of collars 87 of different lengths arranged to be placed at the respective sides of the rotary cutter-blades. The collars on each arbor may include one of a length equal to the thickness of the cutter-blades, these collars 88 being placed at opposite sides of the respective cutter-blades and opposite the mating cutter-blades. The collars and cutter-blades are held fixedly to their respective arbors by means of clamp-nuts 91, 92, received over the threaded ends 93, 94, of the arbors.

The slide 83 is adjustable up and down on guides 96 of the column, for instance, by an adjusting screw 97, journaled in a bearing 98, of a bracket 99, shown as on a bracket-piece fixed to the upper end of the column by means of bolts 100. The screw is provided with an enlargement 101, received in a socket in the bearing for supporting the screw and the slide depending therefrom. (See Fig. 5.) A handle 102 is arranged to rotate the screw. A collar 103 is releasably secured to the screw and has graduation marks of a gage 104 thereon, arranged to register with the mark 105 on the bearing, for determining the amount of adjustment of the arbor 75 to obtain proper adjustment between the cutter-blades. The slide is clamped in adjusted positions by means of a bolt 108, provided with a handle 109, and coacting with a gib 110 of the guide. (See Figs. 3 and 4.) The bolt 108 may be supplemented by bolts 111 holding the parts in slidable relation.

The bearing-slide 84 is arranged to be positioned vertically on the guides 96, and to be fixed in adjusted positions, for instance by means of bolts 112 threaded into a gib 113 similar to the gib 110, and clamping the gib in place so as to fix the slide 84 in desired positions.

Ordinarily adjustment of the slide 84 is not required, as most vertical adjustments may be made by adjustment of the upper arbor and the knee, these adjustments being accurate and for a substantially wide range of adjustments. If desired, however, the lower arbor may be adjusted for major adjustments, and the minor or fine adjustments may then be accomplished by adjustments of the upper arbor and the knee. Axial adjustments of the rotary cutter-blades may be accomplished by shifting of the collars of various thicknesses on the arbors and placing the cutter-blades between selective collars, and lateral adjustments may also be accomplished by the adjusting screw 33 for adjusting the saddle toward and from the column and consequently adjusting the blank crosswise of the planes of the cutter-blades.

The slide 83 may be provided with a bearing 115, shown as a clamp-bearing, for clamping in place an over-arm 116, having a clamp-bearing 117, at its outer end arranged to be clamped thereto by means of a nut and bolt 118. The bearing 117 has a depending arm 119, supporting a clamp-bearing 120, for clamping a tail-center 121 in adjustable position, as by means of a bolt and nut clamp 129. The bearings 117, 120, arm 119, and over-arm 116, have a slotted bar 122 secured thereto, by means of a bolt 123 received through the slot 124 of the bar and into the over-arm 116, and a bolt 125 received through said slot and threaded into said depending arm. The slotted bar has a clamp-bearing 126 thereon, in which a tail-center 127 is clamped in adjusted positions by a nut and bolt 128 for coacting with the arbor 76.

The means provided for rotating the rotary cutter-blades consist of gears 131, 132, suitably secured to the respective quills 79, 80. One of the quills, for instance the quill 80, is shown extended by an extension 133, which has a pulley 134 suitably fixed thereto, driven by a belt passing over said pulley and a pulley 137 on a countershaft 135 on a bracket 136 of the column. The gears are normally out of engagement with each other. Transmission from one of the gears to the other is had by means of a gear 139 which rotates on a stud-shaft 140 fixed to the column and also having the bearing 141 of a quadrant 142 received thereover. The gear 139 meshes with the gear 132. A gear 143 meshes with the gear 139, and rotates on a stud-shaft 144 on the quadrant.

The quadrant is provided with a segment-slot 145, through which a bolt 146 provided with a handle is received for being threaded into the column and clamping the quadrant in adjusted positions. When the quadrant is swung in one direction, the gear 143 is placed out of mesh with the gear 131, and when swung in the other direction, the said gears are placed in mesh. The range of adjustments of the arbor up and down on the column is in practice such that the movements of the gears stated suffice to obtain proper meshing relations between the gears. The rotary cutter-blades preferably rotate in the direction of the arrows a, b, shown in Fig. 1, the teeth of the rotary cutter-blades preferably extending in the directions there shown.

The means for holding the blank are shown as a pedestal 151, provided with jaws 152, 153, having an open-ended recess 154 between them. The pedestal is arranged to be clamped in adjusted positions lengthwise of the table, as by T-bolts 155, the heads of which are received in a T-slot 156 in the table, the bolts extending through holes 157 in feet 158 of the pedestal. Clamp-nuts 159 clamp the pedestal to the table.

A clamp 161 is provided with jaws 162, 163, having an open-ended recess 164 between them. The latter jaws coact with the jaws 152, 153, for clamping the blank in place. The clamp is shown pivoted by a bearing 165 about a bolt 166, passing through ears 167 of the pedestal and said bearing, and having a nut 168 received thereover, for holding the parts in place. The clamp swings on said bolt, and is normally urged into unclamping relation by a spring 169 located between the pedestal and the clamp.

A cam 171 is pivoted on a bolt 172 passing through bearings 173 in uprights 174, extending from the pedestal past the clamp. The cam is provided with a handle 175, forming a cam-lever, a movement whereof about its pivot in one direction, for instance in a down direction, acts to clamp the blank between the jaws, and a movement in the other direction acts to unclamp the blank, the action of the spring fully releasing the cut piston ring, ready for insertion of another blank between the jaws.

The jaws are so related that they clamp the blank at both sides of the portion of the blank which it is intended to cut, so as to firmly hold the blank while being cut and prevent shifting or chattering thereof. The jaws are made preferably sufficiently wide to accommodate different diameters of blanks for making different diameters of piston rings. Means are also provided for adjustably positioning the blanks, for instance by means of a guide 176, (see Fig. 8), provided with separated contact-lugs 177, against which the blank is arranged to be placed. The guide is provided with a slot 178, through which a bolt 179 passes; the bolt being threaded into the pedestal. The guide is located between the pedestal and the clamp.

In operation, the blank is placed on the pedestal against the contact-lugs 177 of the guide 176, the guide having been adjusted to position to accommodate the particular size of blank which it is desired to cut. The pedestal will also have been adjusted lengthwise of the table for suitable positioning of the same, depending on the size of blank and the position of the table at which it is desired to have the cutting performed. The clamp 161 is then clamped upon the blank by means of manipulation of the cam-lever 171 for fixing the blank rigidly in place on the table. The table is then moved lengthwise by manipulation of the arm 53.

The stops 65, 66, have been adjusted to determine the range of movement of the table and the position of this movement, so that movement of the table in one direction will place the jaws in position to receive the blank without interference by the rotary cutter-blades. The movement of the table causes the passing of the forward advancing portion of the blank between the cutter-blades. During this movement the cutter-blades are received in the recesses 154, 164. When the cutter-blades have passed through the forward advancing portion of the blank so as to have made a cut of equal depth throughout for each of the cutter-blades, across said portion, the stop 66 will strike the stationary stop 70 for arresting the advance movement of the table. The table is then retracted, the clamp unclamped, the blank removed as a cut piston ring, and a new blank inserted; and the operation repeated.

The cutter-blades are so adjusted that the proximate sides of the teeth thereof, are in substantially the same plane, and the proximate points in the circles of the path of the teeth are substantially coincident and in the middle of the thickness of the blank, so that when the blank has the forwardly advancing portion of its circumference passed between the cutters, a groove will be cut at each face of the blank, shown by the grooves 181, 182, in Figs. 7 and 10, the proximate ends of the grooves meeting so as to sever or split the closed blank and form a split ring, shown at 183 in Fig. 10. Each of the grooves then forms a rabbet at one face of the piston ring and a tongue 185 at the other face of the piston ring, and each of the tongues is arranged to be received in one of the grooves by reducing the diameter of the piston ring smaller than the diameter of the blank.

The blank is a normally resilient metal, and when the rabbets and tongues have been formed therein, the formed ring may be reduced in diameter for having the tongues received in the rabbets, the normal resiliency of the metal tending to spread the piston ring to the greater diameter of the blank from which it was formed, for continuously pressing outwardly when in its groove in the piston, for continuously engaging the inner face of the wall of the cylinder in which the piston reciprocates, it being understood that when the piston ring is in this position, the tongues substantially occupy the rabbets fully.

By means of my improved device, exceptionally excellent piston rings are produced rapidly and accurately, by simple mechanism easily adjusted and easily operated, the mechanism being furthermore strong and substantial, and the parts related for rapid and large production of piston rings.

Having thus fully described my invention, what I claim as new, and desire to secure by Letters Patent, is:

1. In a metal working machine for making piston rings, the combination of a pair of arbors, means for rotating said arbors, a pair of cutter-blades on said arbors, means for adjusting said cutter-blades to locate the proximate sides of the teeth thereof in substantially the same plane and the points of closest approach in the paths of said respective teeth in substantially coincident positions, means for supporting a blank for a piston ring, and means whereby to cause approach between said blank and said cutter-blades to cut proximate grooves in opposite faces of said blank and sever said blank at the proximate ends of said grooves to form rabbets and tongues arranged to be received in said rabbets.

2. In a metal working machine for making piston rings, the combination of a pair of arbors, a cutter-blade on each of said arbors, means for rotating said arbors, a column, a pair of superposed slides on which said arbors are respectively journaled, a slidable table under said arbors, means thereon for supporting a blank for a piston ring, means for adjustably positioning the lower one of said slides on said column, screw adjusting means for the upper one of said slides, and screw adjusting means for said table for adjusting said upper slide and said table toward and from said lower slide, and means for positioning said cutter-blades whereby to place the proximate sides of the teeth thereof respectively in substantially the same plane and the points of closest approach in the paths of said respective teeth in substantially coincident positions for cutting proximate grooves in opposite faces of said blank throughout the widths of said faces and severing said blank at the proximate ends of said grooves to form rabbets and tongues arranged to be received in said rabbets.

3. In a metal working machine for making piston rings, the combination of a column, a pair of superposed slides on said column, an arbor journaled in each of said slides, a cutter-blade on each of said arbors, a slidable table under said arbors, a support thereon for a blank for a piston ring, an over-arm in the upper one of said slides, an arm depending from said over-arm, a bar depending from said arm, centers in said arm and bar respectively for said respective arbors, means for adjusting the distances between said respective slides and said respective centers, clamping means for fixing said centers in relatively adjusted positions, and means for axially adjusting said cutters, whereby to position the proximate sides of the teeth thereof respectively in substantially the same plane and the points of closest approach in the paths of said respective teeth in substantially coincident positions in order to cut proximate grooves in opposite faces of said blank throughout the widths of said faces and sever said blank at the proximate ends of said grooves to form rabbets and tongues arranged to be received in said rabbets.

4. In a metal working machine for making piston rings, the combination of a pair of arbors, means for rotating said arbors, a pair of cutter-blades on said arbors, means for adjusting said cutter-blades to locate the proximate sides of the teeth thereof in substantially the same plane and the points of closest approach in the paths of said respective teeth in substantially coincident positions, a table slidable under said arbors, means thereon for supporting a blank for a piston ring, and means for reciprocating said table comprising a rotatable part having operative connection with said table, an extended arm, and adjustable connection between said arm and said rotatable part whereby to position said arm to effect a movement of said table in cutting direction by downward gravity movement of said arm.

5. In a metal working machine for making piston rings, the combination of a pair of arbors, a bushing for each of said arbors, a cutter-blade on each of said arbors, a pair of slides on which said bushings are respectively journaled, means for adjusting the distance between said slides, and means for axially adjusting said cutter-blades to locate the proximate sides of the teeth thereof in substantially the same plane and the points of closest approach in the paths of said respective teeth in substantially coincident positions, a gear on each of said bushings, a pair of meshing gears arranged to respectively mesh with said last-named gears, a segment-arm on which one of said gears of said pair of gears is located, a pivot-bearing for said segment-arm about the axis of rotation of the other of said gears of said pair of gears, and locking means for said segment-arm, whereby to transmit rotative motion from one of said bushings to the other of said bushings in opposite directions throughout the adjustments for separation of said slides.

6. In a metal working machine for making piston rings, the combination of a pair of arbors, means for rotating said arbors, a pair of cutter-blades on said arbors, means for adjusting said cutter-blades to locate the proximate sides of the teeth thereof in substantially the same plane and the points of closest approach in the paths of said respective teeth in substantially coincident positions, a slidable table, a pedestal thereon and a clamp on said pedestal for clamping the blank of a piston ring in overhanging relation for presentation of the periphery of said blank to said cutter-blades, and a gravity device for the feed of said table.

7. In a metal working machine for making piston rings, the combination of a pair of arbors, means for rotating said arbors, a pair of cutter-blades on said arbors, means for adjusting said cutter-blades to locate the proximate sides of the teeth thereof in substantially the same plane and the points of closest approach in the paths of said respective teeth in substantially coincident positions, a slidable table, a pedestal thereon provided with spaced-apart jaws, a clamp pivoted to said pedestal, said clamp provided with spaced-apart jaws mating said first-named jaws, means for normally raising said clamp, and eccentric means acting on said clamp to clamp the blank of a piston ring between said jaws, and feeding means for said table to move the periphery of said blank past said cutter-blades.

In testimony whereof, I have hereunto signed my name in the presence of two subscribing witnesses:

HARRY A. HECKMANN.

In presence of—
Louis T. Murphy,
Delma Wernsing.